United States Patent
Pennell et al.

(10) Patent No.: US 6,874,023 B1
(45) Date of Patent: Mar. 29, 2005

(54) WEB BASED EMAIL CONTROL CENTER FOR MONITORING AND PROVIDING A SUMARY OF THE DETECTED EVENT INFORMATION ORGANIZED ACCORDING TO RELATIONSHIPS BETWEEN THE USER AND NETWORK SITES

(75) Inventors: Mark E. Pennell, Austin, TX (US); Aleksandar Sasa Zorovic, Palo Alto, CA (US); Denis R. Coleman, Atherton, CA (US)

(73) Assignee: Claria Corporation, Redwood City, CA (US)

( * ) Notice: Subject to any disclaimer, the term of this patent is extended or adjusted under 35 U.S.C. 154(b) by 0 days.

(21) Appl. No.: 09/437,812

(22) Filed: Nov. 10, 1999

Related U.S. Application Data

(60) Provisional application No. 60/107,790, filed on Nov. 10, 1998.

(51) Int. Cl.[7] .......................... G06F 15/173; G06F 15/16
(52) U.S. Cl. ........................ 709/224; 709/203; 709/219; 709/225
(58) Field of Search ........................ 709/245, 200–207, 709/219, 224, 225

(56) References Cited

U.S. PATENT DOCUMENTS

| 5,822,526 A | * | 10/1998 | Waskiewicz | 709/206 |
|---|---|---|---|---|
| 5,832,502 A | * | 11/1998 | Durham et al. | 709/206 |
| 5,923,845 A | * | 7/1999 | Kamiya et al. | 709/201 |
| 5,930,700 A | * | 7/1999 | Pepper et al. | 379/211.02 |
| 5,961,593 A | * | 10/1999 | Gabber et al. | 709/219 |
| 5,978,836 A | * | 11/1999 | Ouchi | 709/203 |
| 5,995,597 A | * | 11/1999 | Woltz et al. | |
| 6,014,711 A | * | 1/2000 | Brown | 709/245 |
| 6,052,709 A | * | 4/2000 | Paul | 709/202 |
| 6,067,561 A | * | 5/2000 | Dillon | 709/206 |
| 6,108,691 A | * | 8/2000 | Lee et al. | 709/206 |
| 6,122,632 A | * | 9/2000 | Botts et al. | 709/206 |
| 6,138,146 A | * | 10/2000 | Moon et al. | 709/206 |
| 6,335,963 B1 | * | 1/2002 | Bosco | |

* cited by examiner

Primary Examiner—Le Hien Luu
Assistant Examiner—Quang N. Nguyen
(74) Attorney, Agent, or Firm—Squire, Sanders & Dempsey, L.L.P.

(57) ABSTRACT

Accessing web sites on which the user has an account and providing notification of changes at the site, and improved electronic mail management is provided, allowing all email to be collected and forwarded from a central site to other email addresses or allowing for the user to view the email at the central site. The user may assign individual email addresses to any number of uses, for example, an individual email address for use in communicating with a particular commercial web site.

23 Claims, 6 Drawing Sheets

WEB BASED EMAIL CONTROL CENTER FOR MONITORING AND PROVIDING A SUMARY OF THE DETECTED EVENT INFORMATION ORGANIZED ACCORDING TO RELATIONSHIPS BETWEEN THE USER AND NETWORK SITES

This application claims the benefit of U.S. Provisional Application No. 60/107,790, filed Nov. 10, 1998.

BACKGROUND OF THE INVENTION

1. Field of the Invention

The invention relates to the field of electronic mail messaging and in particular to a web based email control center for managing emails from multiple senders to different email addresses utilized by a particular user.

2. Description of the Related Art

Today, a user accessing web sites over the World Wide Web graphical user interface portion of the Internet may do so via one or more "portals" or "aggregators". With reference to FIG. 1, an individual can access various web sites over the Internet 100 using a web browser software application 101 such as Netscape Navigator available from American Online (AOL), or Internet Explorer available from Microsoft Corporation. The web sites provide such diverse services as online stock brokerage accounts 102, retail accounts 103, travel services 104, online auctions 105, online magazines and newspapers 106, and the like. In one instance, the user may access various web sites via a particular Internet portal site 110, such as America Online (AOL), and in another instance, access other web sites via a different portal site 120, such as Yahoo!

Visiting multiple web sites to check news, obtain stock quotes, examine retail orders, or book travel plans, can be cumbersome and repetitive. Retrieving information from multiple accounts is time consuming. Moreover, many sites require a user to provide personal information, such as his name, address, credit card number, and email address. Providing such information also raises privacy concerns and opens the door for unsolicited emails directed to the user. A user visiting certain web sites may be reluctant to either provide their email address or provide a fake email address.

Accordingly, there is a need for a method and apparatus that provide for increased ease and convenience in managing a user's Internet communications, while at the same time ensuring the user's privacy and minimizing unsolicited email communications with the user.

BRIEF SUMMARY OF THE INVENTION

Methods and apparatus according to embodiments of the invention provide for accessing web sites on which the user has an account and providing notification of changes at the site. Embodiments also enable information to be collected, organized, presented and forwarded, such as change or status information corresponding to one or more of a user's accounts. Electronic mail management embodiments are also provided, enabling email to be collected and forwarded from a central site to other email addresses, or enabling the user to view the email at the central site. A user may, for example, assign individual email addresses to any number of uses, such as an individual email address for use in communicating with a particular commercial web site. Embodiments further enable such information handling to be conducted automatically.

Figure 1:
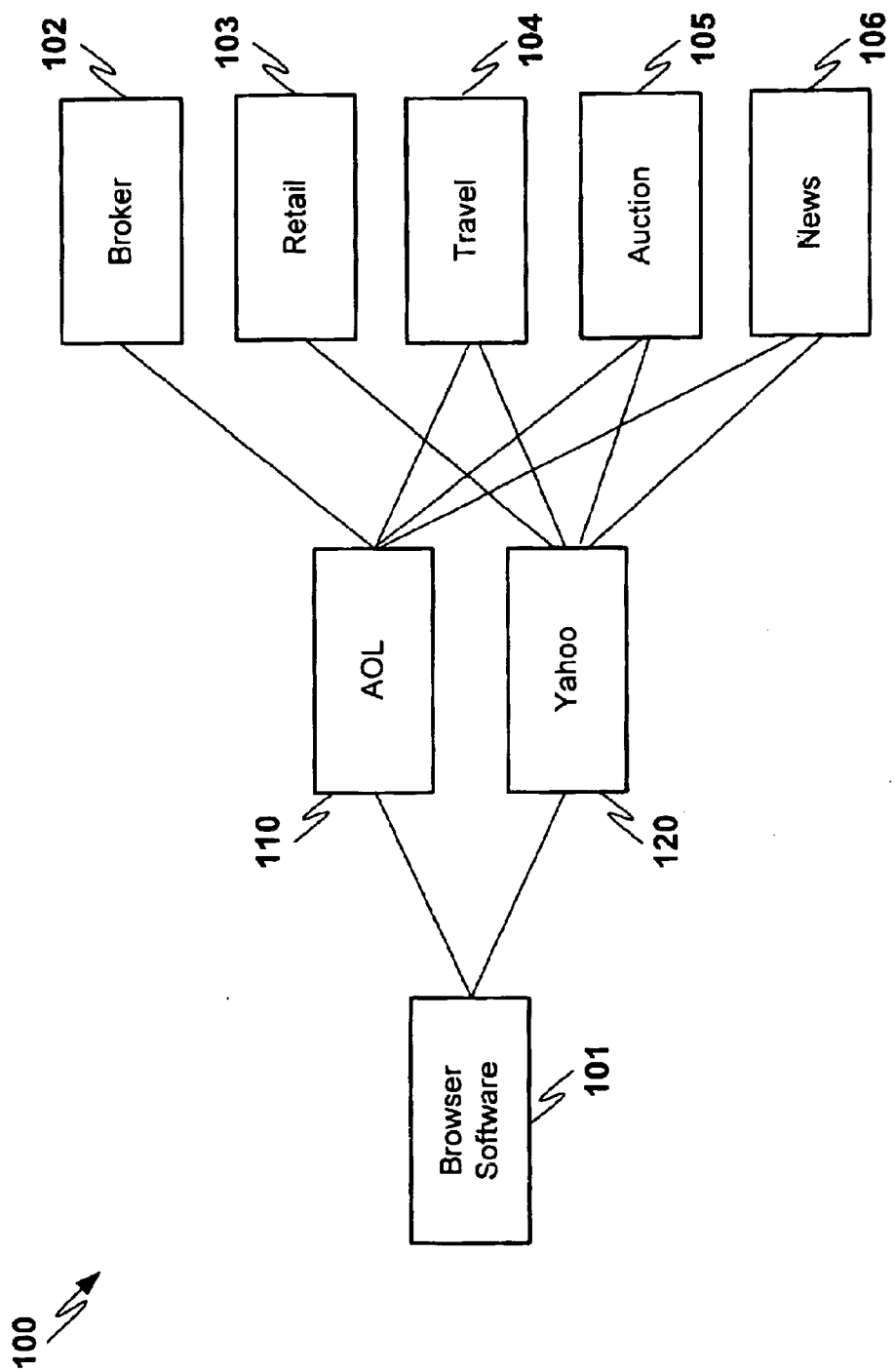
FIG. 1 illustrates a prior art system for communicating with multiple web sites via a web browser software application.

For ease of reference, reference numerals in the accompanying drawings typically are in the form "drawing number" followed by two digits, xx; for example, reference numerals may be numbered 3xx. In certain cases, a reference numeral may be introduced on one drawing and the same reference numeral may be utilized on other drawings to refer to the same item.

DETAILED DESCRIPTION

Figure 2:
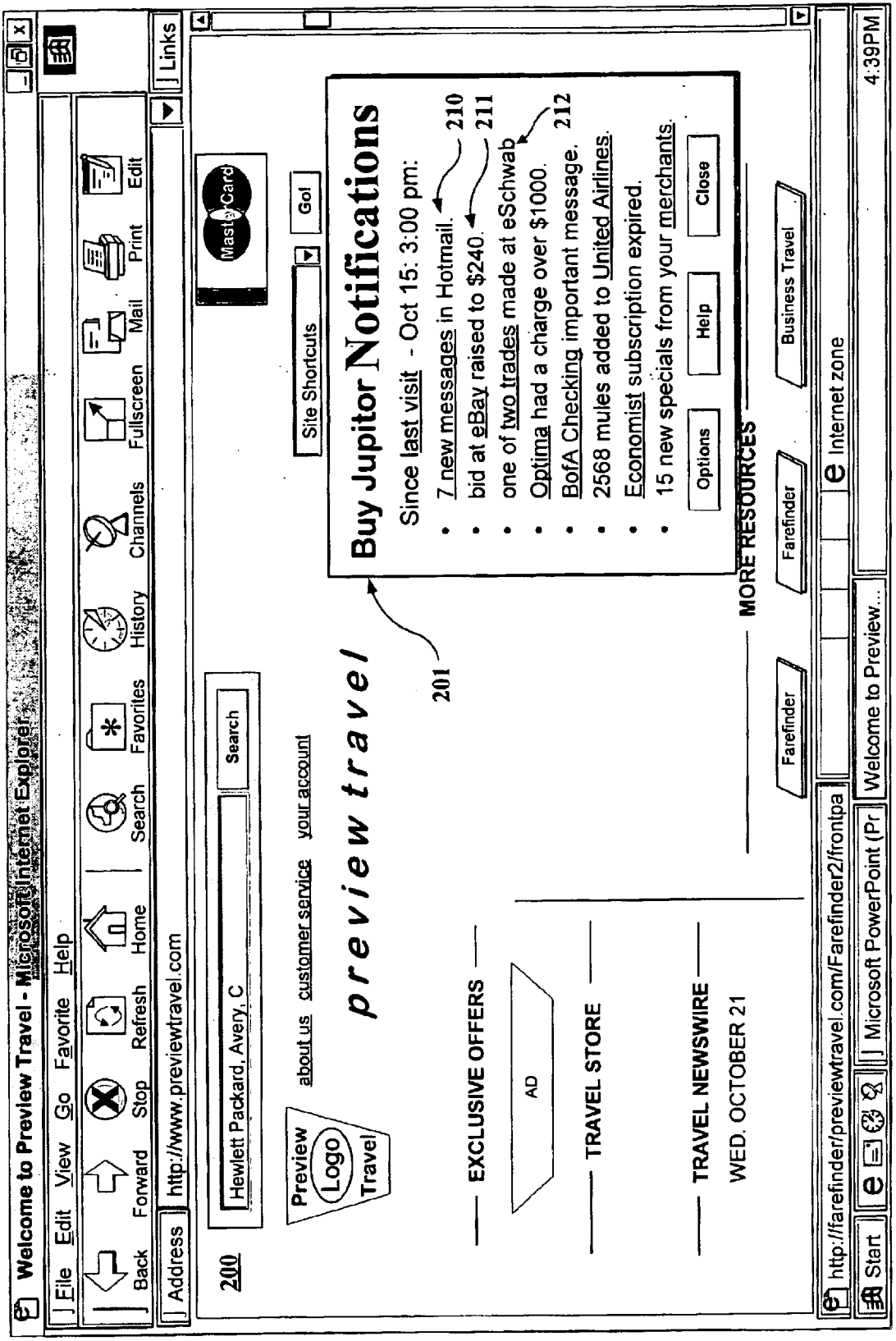
FIG. 2 illustrates single site notification of changes in status of a user's web site accounts in accordance with an embodiment of the present invention.

FIG. 2 illustrates a web site change notification screen 201 in accordance with the present invention. A user receives notification of changes and status of multiple online accounts while visiting a web site 200, in this instance, the preview travel web site. The user accesses the web site using a browser software application executing on a computing device, such as a personal computer, connected to the Internet's world wide web. It should be noted that while the described embodiment operates in conjunction with the Internet, the present invention may be implemented in an Intranet environment as well.

The notification screen is provided by a web site change notification software application. The notification software may be implemented as part of the web browser application, or a stand alone application. Additionally, the application may reside locally, at the user's computer, or reside at a central location, e.g., a server, accessible over the Internet. The software application underlies a fee-based or free service that may be provided by an e-commerce business, e.g., BuyJupiter in the illustration provided in FIG. 2

The notification screen 201 provides up to date information for each of the sites listed in the screen 201. In one instance, the listed sites are previously selected by the user. The sites are listed if a change in status of the user's account at the sites is detected by the change notification software. Alternatively, the software may display the status of a selected number of most recently visited web sites in which the user conducted a transaction. Thus, screen 201 displays the status of the user's Hotmail email account 210, the change in status of a bid on the auction site, eBay 211, stock trading activities at the user's online brokerage account 212, etc.

The change notification software may be configured so that it periodically displays screen 201, or displays the screen when the user visits a particular web site, or displays the screen when requested by the user. In any case, the change notification software provides seamless notification of all the user's transactions in a single, easy to view, pop up window. If the user desires further information regarding status of their account at a particular web site, the user may specify the Uniform Resource Locator (URL) address in the web browser, or follow a hyperlink to the site, if provided in the notification screen.

In another aspect of the invention, the Internet user is provided with significant flexibility and privacy in managing electronic mail messages. In one embodiment, the invention generates a new, revocable email address whenever needed or requested by the user; the user's primary email address is not needed to communicate with a web site. For example, the user may wish to remain anonymous when visiting a particular web site, as when checking out a competitor's web site that requires registration. An embodiment of the present invention allows the user to specify a unique email address for use in communicating with the service provided by the web site.

Additionally, the embodiment sends all emails to the user at a web based central email center and optionally sorts them by sender or other user configured designation. In this manner, an embodiment of the present invention enables a user to stop or suspend email from any sender at any time or forward the email to another email address, e.g., the user's business or Hotmail email address instead of the user's personal email address.

In another embodiment, the present invention provides notification of receipt of an email on the user's computer display screen.

Figure 3:
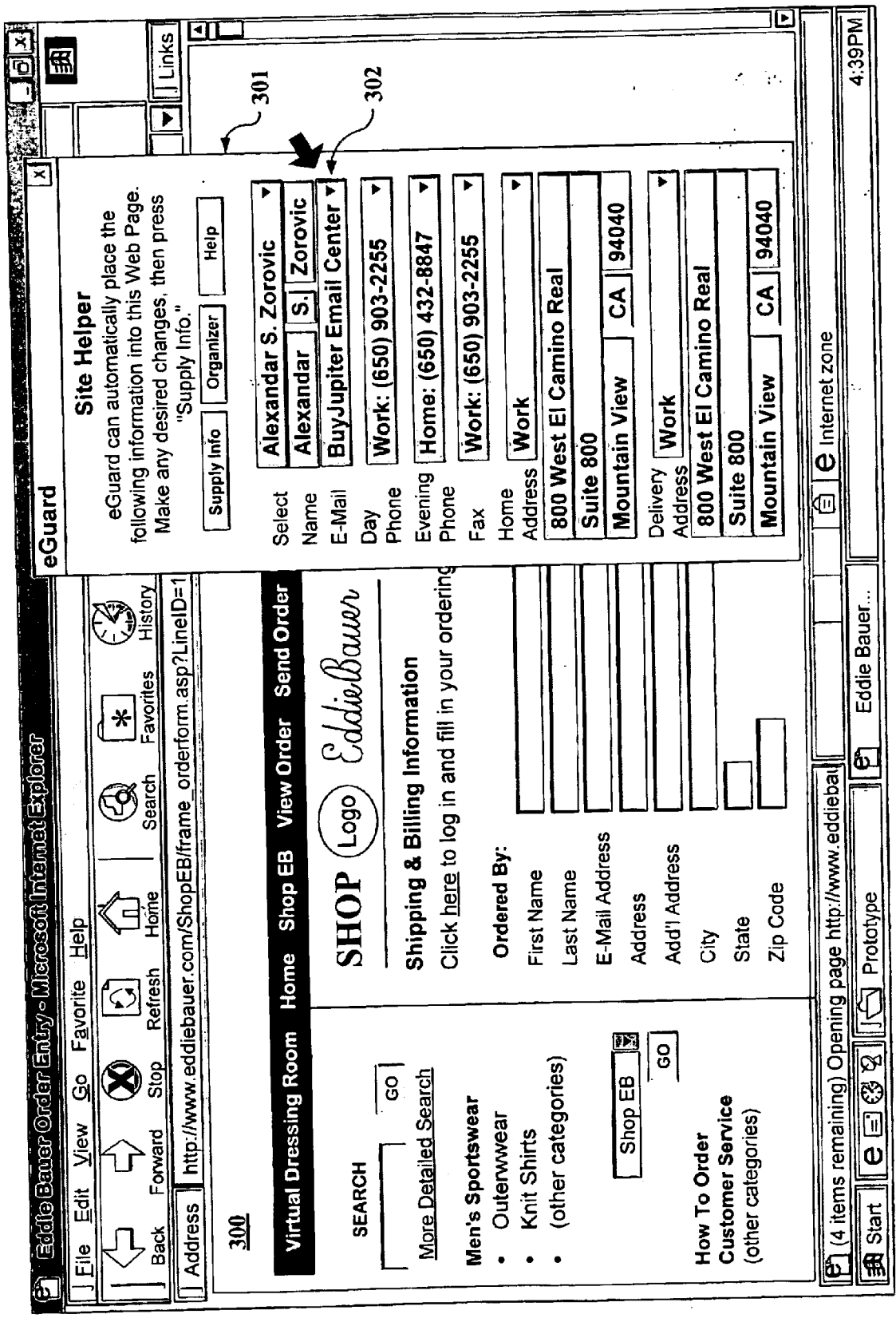
FIG. 3 illustrates generation of a unique email address for use in communicating with a web site in accordance with an embodiment of the present invention.
Figure 4:
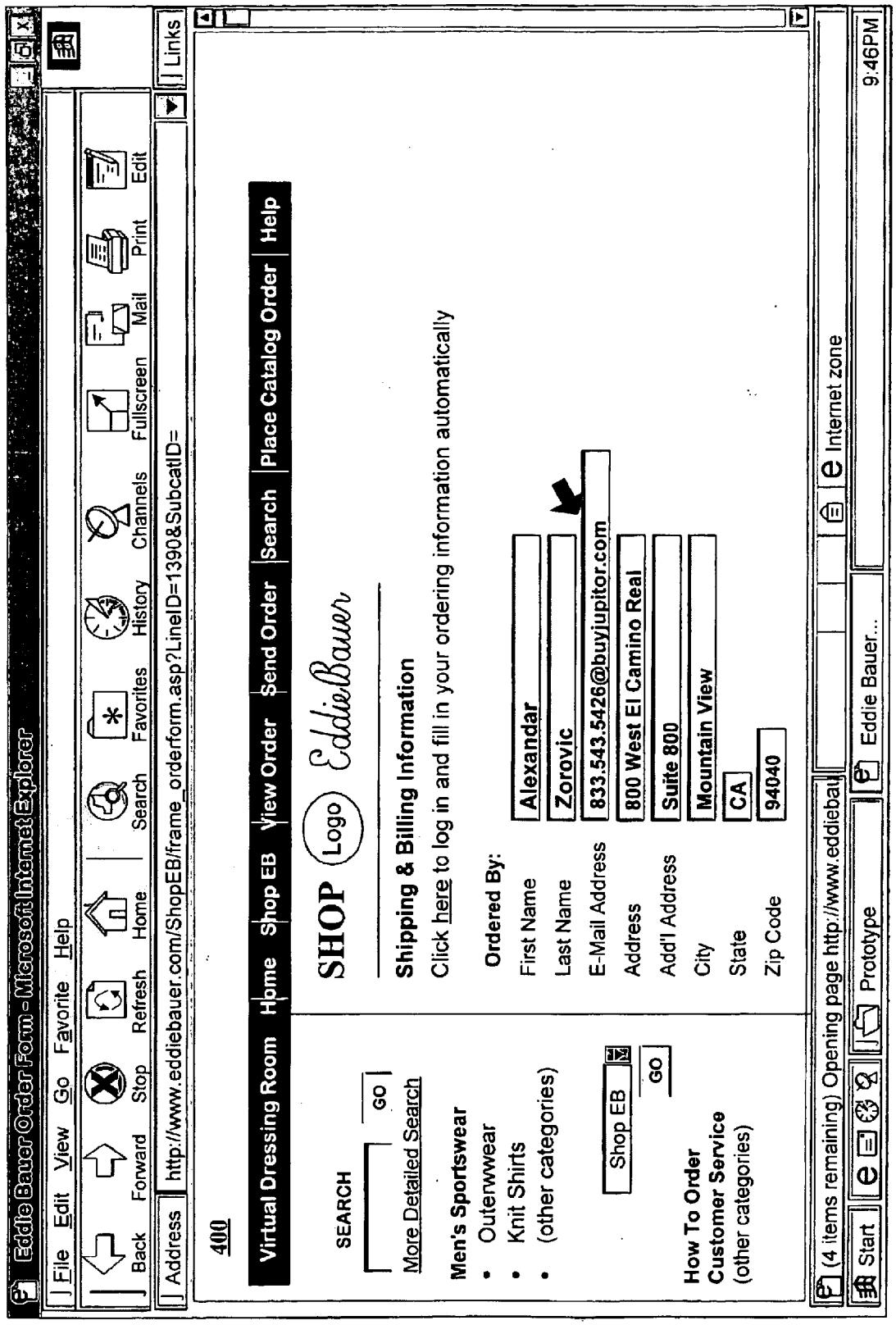
FIG. 4 further illustrates generation of a unique email address for use in communicating with a web site in accordance with an embodiment of the present invention.

The above mentioned email features of the present invention are better understood with reference to FIGS. 3 and 4. In FIG. 3, the user is visiting the Eddie Bauer web site 300, and is being asked by the web site to providing shipping and billing information, including the user's email address. A pop up window 301 is provided by an embodiment of the present invention to supply the necessary shipping and billing information. In particular, the user is able to specify at 302 the email address with which to correspond with the user. Email is to be sent to the BuyJupiter email center.

As seen in FIG. 4, when the user information is supplied to the form at the web site 300 by the clicking on the fields in the pop up window 301, a unique email address 400 is created by concatenating a numeric value 833.543.5426 to the high level domain name @buyjupiter.com. When the user registers at another web site, a different numeric value is provided by the present invention so that each account set up by the user may utilize a unique email address. If the user then receives email from the web site, whether solicited or unsolicited, the user is able to discern the sender of the email, as well as control future email correspondence with the web site by discarding the email address. It should be understood that while the email address generated by an embodiment of the present invention utilizes a numeric prefix, any alphanumeric character string that conforms with the applicable email communication standard, such as SMTP, may be utilized in conjunction with the high level domain name portion of the email address.

Figure 5:
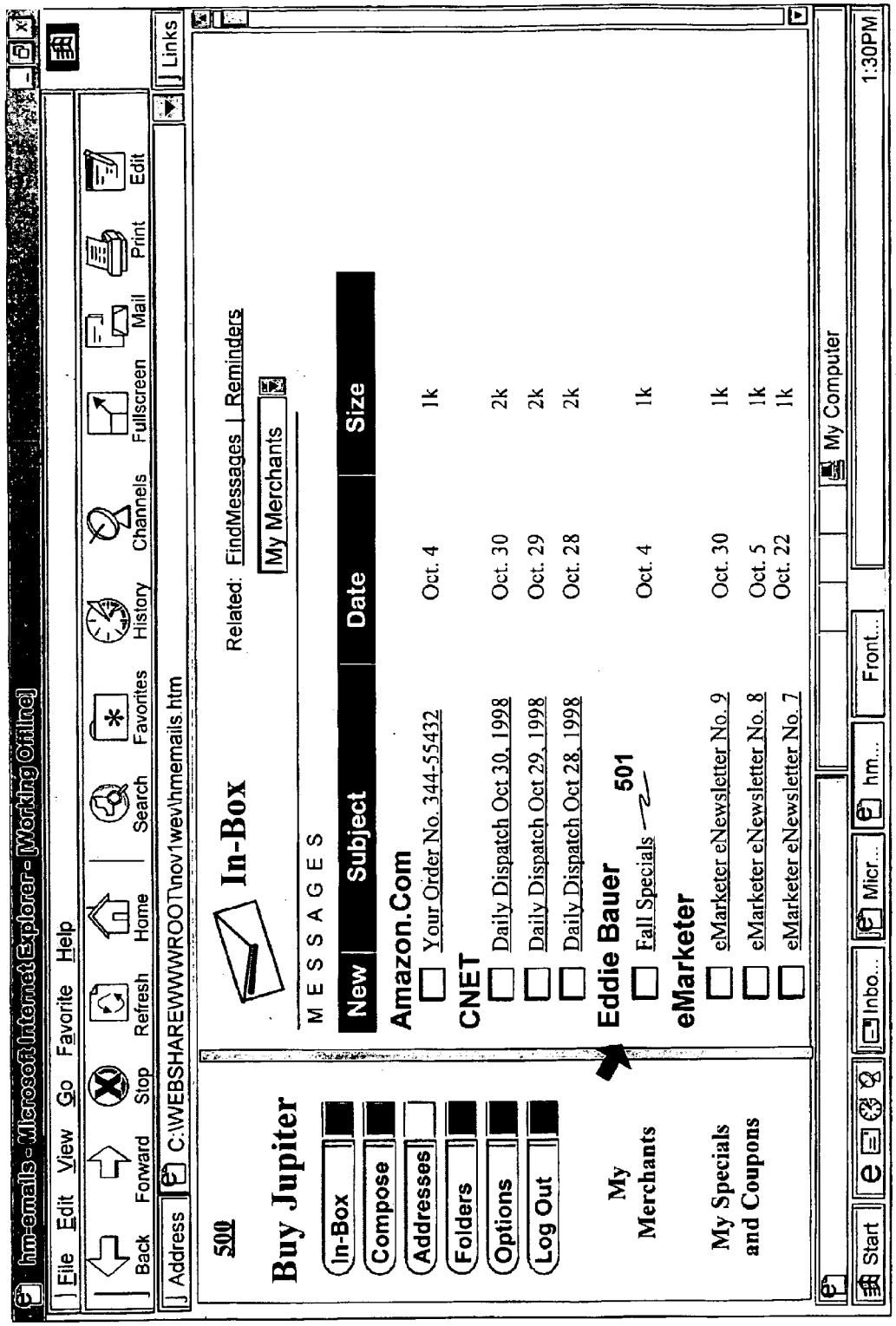
FIG. 5 illustrates a user's email inbox in accordance with an embodiment of the present invention.
Figure 6:
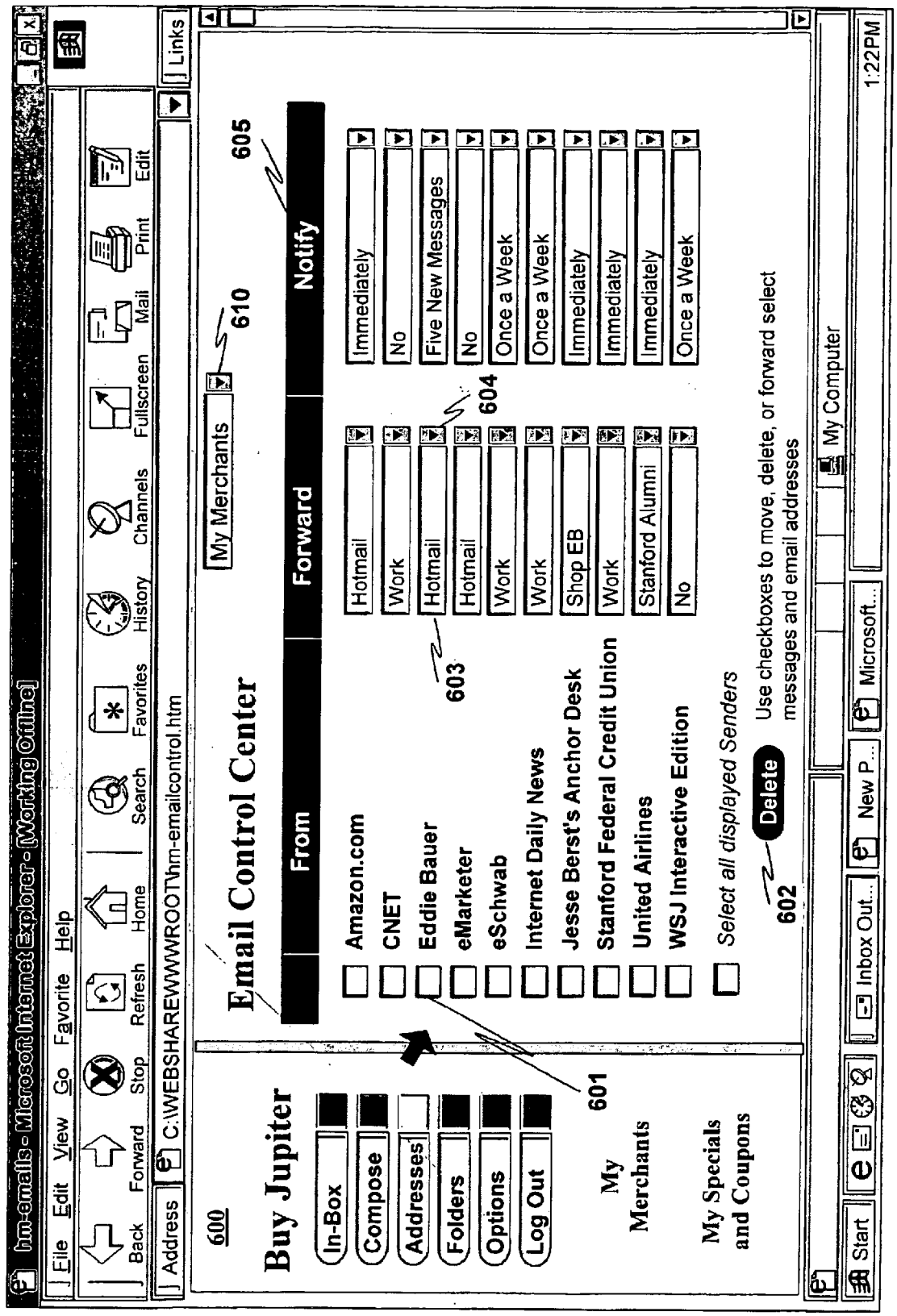
FIG. 6 illustrates an email control center and options related thereto in accordance with the present invention.

In FIG. 5, the user's inbox at the email center "BuyJupiter" is illustrated. Email is identified and sorted according to sender. Thus, an email from the Eddie Bauer web site is easily identified at 501. FIG. 6 illustrates the email control center 600 as envisaged in accordance with the present invention. One of the key advantages of the control center is the automatic aggregation of information at one site, rather than requiring the user to visit multiple sites to view the information. Additionally, although the user is specifying different email addresses for different accounts at different web sites, the user can receive notification at one site from each of the sites, providing for convenient, private electronic communication with the multiple accounts.

By selecting a check box associated with a particular web site, a user may delete the email address used by that particular web site to communicate with the user so that the user no longer receives email messages from the web site. For example, if the user wishes to no longer receive email from the Eddie Bauer web site, the user selects the check box 601 with a user input device such as a mouse pointer and then presses the delete button 602. Thereafter, Eddie Bauer is removed from the user's email control center as a sender of email to the user.

In another aspect of the present invention, the user may configure an actual email address used by the user to which to forward email received at the email control center via the email address generated, for example, at 400. Thus, if a user wished to receive an email from the Eddie Bauer web site at the user's Hotmail email account, the user could forward the email to the user's Hotmail email address 603. The pull down list 604 allows the user to add to or select from any one of a number of different email addresses utilized by the user. In this manner, the user may receive email messages from a web site without having to identify the user's actual email address to the web site, thereby ensuring the user's privacy and ability to discard unwanted and/or unsolicited emails.

The email center further provides for the user's ability to configure when and how often to receive an email from a given sender. The notify column in the email control center provides for the user to configure whether to receive an email from a particular sender immediately, never, every so often, e.g., once a week, or after a particular number of email messages are received from the sender and accumulate in the user's email control center. In the instance case, the user has configured the email control center to forward email messages from the Eddie Bauer web site to the user's Hotmail email account upon receipt of five new messages from the web site.

Given enough web sites with which the user has registered, the number of entries in the user's email control center becomes too numerous to easily view in the screen display depicted in FIG. 6. The user is able to separate and categorize web sites according to user defined preference. At 610, the user is provided a pull down list with which to add or select one of a number of categories, e.g., merchants, news, business, or the like, so that only web sites for a particular category are displayed.

ALTERNATIVES TO THE ABOVE EMBODIMENTS OF THE PRESENT INVENTION

There are, of course, alternatives to the described embodiment which are within the reach of one of ordinary skill in the relevant art. The present invention is intended to be limited only by the claims presented below.

What is claimed is:

1. A method performed by a processing system, comprising:

detecting one or more online events in response to one or more commands from a user of a plurality of network sites;

accumulating event information corresponding to the online events; and presenting presentation information to a user corresponding to the event information, the presentation information comprising a summary of the event information organized according to relationships between the user and the plurality of network sites, the presentation information being presented in a message window while the user is accessing the network utilizing a browser application.

2. A method according to claim 1, wherein the detecting comprises receiving an email change or status notification that includes an email address corresponding to the user and one or more of the network sites.

3. The method as recited in claim 2, further comprising forwarding via a network the email change or status information to an email address pre-selected by the user.

4. The method as recited in claim 3, wherein the user defines how often the email change or status information is forwarded to the pre-selected email address.

5. A method according to claim 1, wherein the detecting comprises
monitoring user activity at the one or more network sites; and
responding to a transaction user activity by generating and forwarding for accumulation a corresponding transaction notification.

6. Presentation information formed according to the method of claim 1.

7. The method as recited in claim 1, wherein the presenting comprises causing an alert corresponding to a notification to be sent to a user device of the user.

8. The method as recited in claim 1, wherein the message window is presented upon receipt of a request from the user.

9. The method as recited in claim 8, wherein the message window is a pop-up window.

10. The method as recited in claim 8, wherein the message window is provided upon the user accessing a particular web site.

11. The method as recited in claim 1, wherein the presentation information includes at least one link for accessing at least a portion of the event information via a network.

12. A system, comprising:
detecting means for detecting one or more online events in response to one or more commands from a user of a plurality of network sites;
accumulating means coupled to the detecting means for accumulating event information corresponding to the online events; and
presenting means coupled to the accumulating means for presenting presentation information to a user corresponding to the event information, the presentation information comprising a summary of the event information organized according to relationships between the user and the plurality of network sites, the presentation information being presented in a message window while the user is accessing the network utilizing a browser application.

13. A system according to claim 12, wherein the detecting comprises receiving an email change or status notification that includes an email address corresponding to the user and one or more of the network sites.

14. A system according to claim 12, wherein the detecting comprises:
monitoring user activity at the one or more network sites; and
responding to a transaction user activity by generating and forwarding for accumulation a corresponding transaction notification.

15. The system as recited in claim 12, wherein the presenting comprises causing an alert corresponding to a notification to be sent to a user device of the user.

16. The system as recited in claim 12, wherein the message window is presented upon receipt of a request from the user.

17. The system as recited in claim 16, wherein the message window is a pop-up window.

18. The system of claim 12, wherein the detecting means, the accumulating means and presenting means reside locally with the user.

19. A computer readable storage medium storing program code for causing a computer to perform the steps of:
detecting one or more online events in response to one or more commands from a user of a plurality of network sites;
accumulating event information corresponding to the online events; and
presenting presentation information to a user corresponding to the event information, the presentation information comprising a summary of the event information organized according to relationships between the user and the plurality of network sites, the presentation information being presented in a message window while the user is accessing the network utilizing a browser application.

20. A method comprising:
monitoring via the network accounts of a user on one or more web sites to detect status changes in the user accounts, the status changes including at least one of: receipt of a message directed to the user, transactions conducted on behalf of the user, charges incurred by the user, rewards given to the user, and expiration of a subscription; and
presenting information to the user that simultaneously summarizes the detected status changes according to the user accounts while the user is accessing the network via a browser window, the information being presented in a window separate from the browser window, the information including at least one link for accessing the one or more user accounts via the network.

21. The method of claim 20, wherein the monitoring and the presenting are performed by an application local to the user.

22. The method of claim 20, wherein the monitoring and the presenting are performed by an application coupled to the network and remote from the user.

23. The method of claim 20, wherein the status changes include: receipt of one or more message directed to the user, one or more transactions conducted on behalf of the user, one or more charges incurred by the user, one or more rewards given to the user, and expiration of one or more subscriptions.

* * * * *